Oct. 21, 1952      A. G. SCHRAMM      2,614,863
SPRING SUSPENSION FOR VEHICLES

Filed July 28, 1951      2 SHEETS—SHEET 1

*INVENTOR.*
ARTHUR G. SCHRAMM
BY *Scott L. Nowiel*

Oct. 21, 1952  A. G. SCHRAMM  2,614,863
SPRING SUSPENSION FOR VEHICLES
Filed July 28, 1951                                           2 SHEETS—SHEET 2

INVENTOR.
ARTHUR G. SCHRAMM
BY Scott L. Norwiel
ATTORNEY

Patented Oct. 21, 1952

2,614,863

UNITED STATES PATENT OFFICE 2,614,863

SPRING SUSPENSION FOR VEHICLES

Arthur G. Schramm, Phoenix, Ariz.

Application July 28, 1951, Serial No. 239,082

2 Claims. (Cl. 280—104.5)

This invention pertains to spring suspension for vehicles, particularly trailers, or the like.

One of the objects of the invention is to provide a spring suspension for two pair of wheels, commonly called, "Tandems" which are closely positioned longitudinally of the vehicle and are supported on stub shafts on wheel arms pivoted to the side of the vehicle frame, so that the bottom of the frame can be kept close to the ground, and arranged so that each wheel is individually sprung and has a maximum amount of resilience and spring action within a compact space at the side of the frame;

Another object is to provide a spring suspension for tandem wheels which will allow a wide latitude of spring movement altho the bed of the vehicle is kept low, and which has a stabilizing spring in addition to the main springs to damp out excessive oscillation and rebound;

Still another object is to provide a spring suspension for vehicles having two pair of tandem wheels independently supported on stub axles extending from wheel arms pivotally attached to the vehicle frame, whereby the load is equally distributed between the wheels on each side regardless of the vertical position of the respective wheels on each side relative to each.

Other objects will appear hereinafter.

I attain the foregoing objects by means of the devices and construction illustrated in the accompanying drawings in which—

Figure 1:
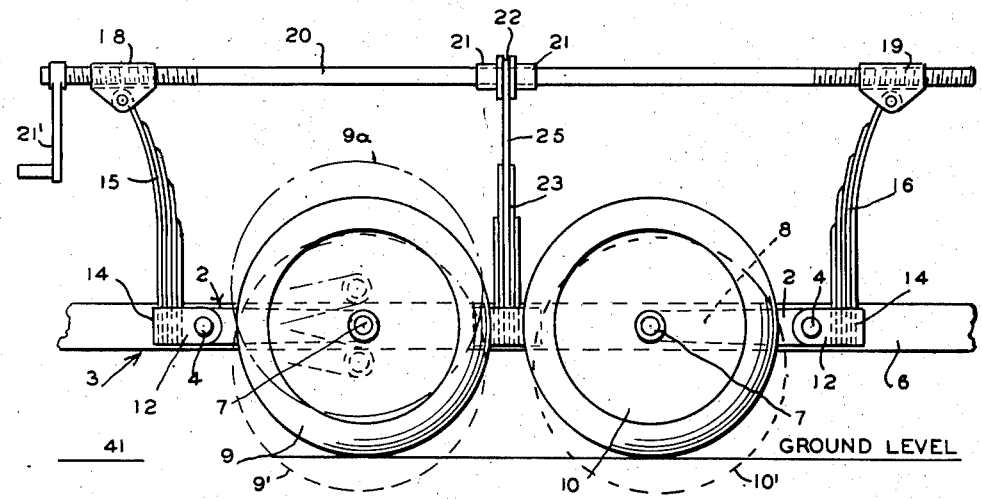
Figure 2:
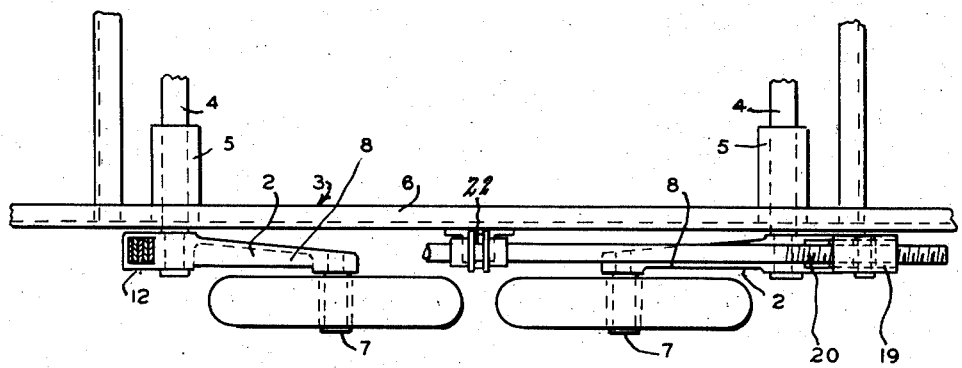
Figure 3:
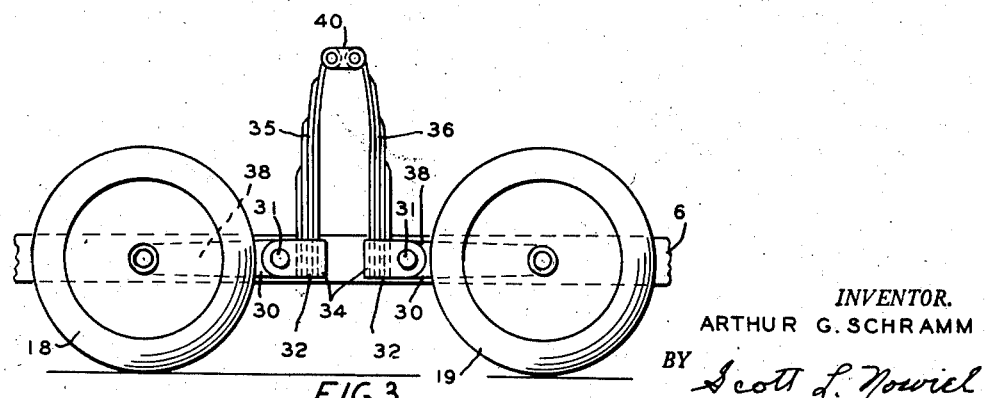
Figure 4:
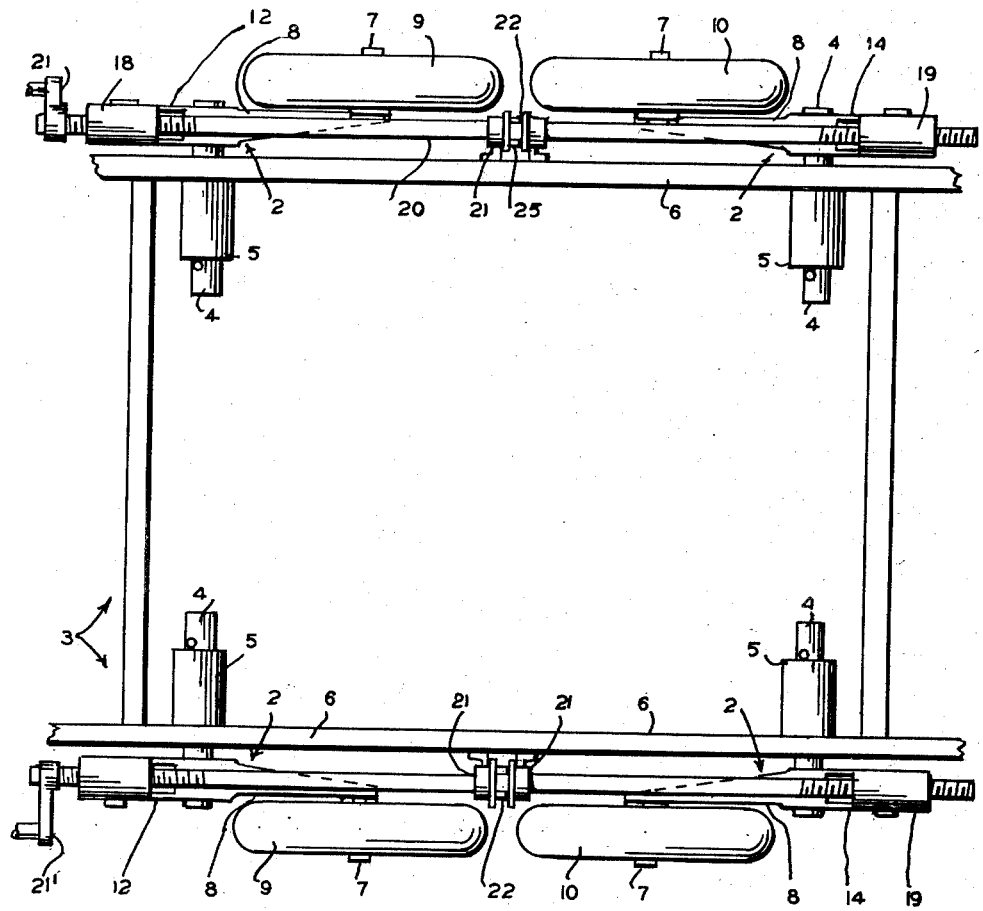

Figure 1 is a side elevation of my device as applied to a trailer frame;

Figure 2, a plan view thereof;

Figure 3, a side elevation of a modified form of the mechanism shown in Figure 1, and Figure 4 is a plan view of my device as applied to a trailer frame, showing wheels on opposite sides of the frame.

Similar numerals refer to similar parts in the several views.

Whereas, in the figures of the drawing only one side of the vehicle frame is shown, it is to be understood that structure which is the opposite counterpart to that shown will be built onto the opposite side of frame 3.

Wheel arms 2 are pivoted to frame 3 by shafts 4 journalled in tubes 5 welded to the inside of longitudinal frame members 6. Stub axle or spindle shafts 7 extend outward from the inner or long ends 8 of arms 2, and wheels 9 and 10 are journalled on these shafts.

At the outer or short ends 12 of arms 2 there are spring boxes 14 which hold the lower ends of leaf springs 15 and 16 respectively. These springs extend upwardly and are pivoted to shackle blocks 18 and 19 at their upper ends. The shackle blocks are threaded longitudinally to receive the tie bar 20. Block 18 and the left end of bar 20 has a right hand thread, and block 19 and the right end of bar 20 a left hand thread. The respective ends of bar 20 are threaded to screw into these blocks. A crank handle 21' is attached to one end of bar 20 so that it may be manually rotated.

In the approximate center of bar 20 there are two collars 21 which include an annular groove 22. A double acting leaf spring 23 is fastened to the frame member 6 approximately midway between wheel arm shafts 4. The upper end of the central leaf 25 is notched to receive bar 20 when it is fitted into groove 22.

The modified form of spring suspension shown in Figure 3 is somewhat simpler than that above described. In this form the long ends 38 of the arms 30 extend away from each other, and the wheels 18 and 19 are mounted on stub spindle shafts near their ends. The spring boxes 34 are mounted on the short ends 32 of arms 30 and are substantially adjacent to each other. The wheel arm supporting shafts 31 are placed closer together on the frame member 6 and springs 35 and 36 extend upward in the space between the wheels, and are joined at the top by shackle links 40.

In use the wheel arms, wheels and springs are mounted, as shown, with the two pairs of tandem wheels on each side of the trailer or vehicle frame 3. In the preferred form, shown in Figures 1 and 2 the tension of the springs is adjusted, by manipulation of crank 21', to turn bar 20 until the arms 2 are substantially horizontal. This is the best riding position. If the load on the vehicle is increased, the tension of the springs is increased by drawing their upper ends closer together. This has a tendency to force both wheels downward as indicated by dotted outline $9^1$ and $10^1$. This pressure on the ground sustains the increased load. Conversely, if the load is lightened the tension between the upper ends of the springs may be lessened by manipulation of handle 21 and rotation of bar 20 accordingly.

If an obstruction is encountered by the front wheel 9 of the tandem pair on either side of the frame (assuming that the vehicle is traveling in the direction of arrow 41) the wheel will be forced up to the position indicated by dotted outline 9a. Spring 15 will be flexed so that its upper end tends to move outward or away from the upper end of the rear spring 16. This places a tension on bar 20 so that the upper end of spring 16 is drawn forward toward spring 15 and it is flexed accordingly. This motion, in turn, tends to force the long end of the wheel arm, carrying rear wheel 10, downward, and wheel 10 is forced toward the ground. Thus, the rear wheel carries its proportion of the load while the front wheel 9 is elevated by rolling over an obstruction or bump. After the forward wheel 9 has passed over the obstruction and it is encountered by rear wheel 10 an action takes place which is the reverse of that just above described. All road unevenness is thus absorbed by the springs and both forward and rear wheels of each tandem pair share in supporting the load.

The above action is modified by centrally positioned damping spring 23. This spring may be made as flexible or as stiff as desired. Its action is to resist motion of bar 20 in either direction. This damping spring does not take the place of or act for either of the wheel arm springs but damps excessive motion of either wheel arm, and tends to prevent collapse of the complete structure and linkage in case the forward wheel encounters a large bump, or depression when moving at a high speed.

In the modified form, Figure 3, the action above described is substantially the same in principle. When the forward wheel 18 encounters a bump the long end of its wheel arm moves upward, the arm pivots on its support in the frame, and the upper end of its attached spring 35 is forced to the rear. Thru shackle links 40 the rear spring 36 is forced rearward and the long end 38 of arm 30 is in turn forced downward. In some ways this form may be made more compact than the form first described, otherwise its action is more limited and the springs cannot be made as long, or their tension adjusted as easily as in the preferred form.

It is to be understood that "tandem pairs" of wheels refers to the forward and rearward wheel on each side. Each tandem pair of wheels, including the above described suspension and linkage is a unit, and is independently mounted on each side of the frame of the trailer or other vehicle.

I claim:

1. A spring suspension for a pair of tandem wheels, adapted to be attached to the side members of a vehicle frame composed of a forward normally horizontal wheel arm pivotally attached to a side member of said frame intermediate of its length so that one end is longer than the other from said point of attachment; a wheel spindle shaft extending laterally outward relative to the frame, from the end portion of the longer end of said arm; a spring mounted in a spring box in the end portion of the shorter end of said arm extending normally upward, and having a shackle block pivotally attached to its upper end; a rear, normally horizontal wheel arm pivotally attached to said side member of said frame intermediate of its length so that one end is longer from said point of attachment than the other; a wheel spindle shaft attached to and extending laterally outward from the end portion of the longer end of said wheel arm; a spring attached to and extending normally upward from the shorter end of said wheel arm, having a shackle block pivotally attached to its upper end; wheels on each of said spindle shafts; and a manually rotatable horizontal linking bar threaded at one end into the shackle block on the spring of the forward wheel arm, and threaded at the other end, into the shackle block on the spring of the rear wheel arm with a thread of reverse pitch; said wheel arms being arranged so that the longer end of the forward arm extends rearwardly and longer end of the rear wheel arm extends forwardly so that said wheels will be closely adjacent, and said springs will be beyond the wheels at each end of each wheel arm.

2. A spring suspension for a pair of tandem wheels, adapted to be attached to the side members of a vehicle frame composed of a forward normally horizontal wheel arm pivotally attached to a side member of said frame intermediate of its length so that one end is longer than the other from said point of attachment; a wheel spindle shaft extending laterally outward relative to the frame, from the end portion of the longer end of said arm; a spring mounted in a spring box in the end portion of the shorter end of said arm extending normally upward, and having a shackle block pivotally attached to its upper end; a rear, normally horizontal wheel arm pivotally attached to said side member of said frame intermediate of its length so that one end is longer from said point of attachment than the other; a wheel spindle shaft attached to and extending laterally outward from the end portion of the longer end of said wheel arm; a spring attached to and extending normally upward from the shorter end of said wheel arm, having a shackle block pivotally attached to its upper end; wheels on each of said spindle shafts; and a manually rotatable horizontal linking bar having an annular groove formed in approximately the middle of its length and being threaded at one end into the shackle block on the spring of the forward wheel arm, and threaded at the other end, into the shackle block on the spring on the rear wheel arm with a thread of reverse pitch; said wheel arms being arranged so that the longer end of the forward arm extends rearwardly and longer end of the rear wheel arm extends forwardly so that said wheels will be closely adjacent, and said springs will be beyond the wheels at each end of each wheel arm; together with a damping spring having a central leaf, with a notch at its upper end attached to said frame at a position between said wheels and extending vertically to said linking bar with its notched central leaf engaging in the annular groove of said linking bar.

ARTHUR G. SCHRAMM.

REFERENCES CITED

The following references are of record in the file of this patent:

FOREIGN PATENTS

| Number | Country | Date |
| --- | --- | --- |
| 646,448 | Germany | June 23, 1937 |